July 18, 1961
R E. DOREMUS ET AL
2,992,654
VALVE MEMBER AND SEAT MATERIAL
Filed June 6, 1958
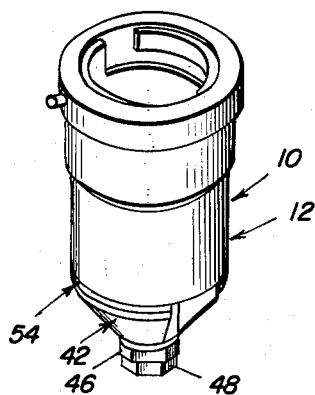
Fig.1
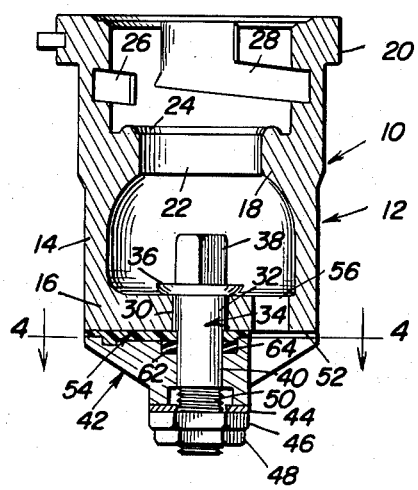
Fig.2
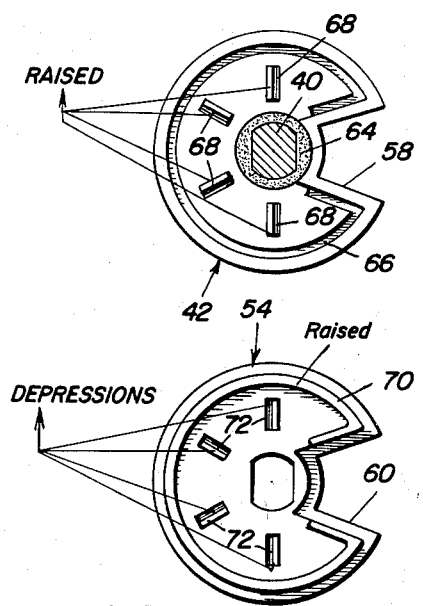
Fig.4
Fig.5
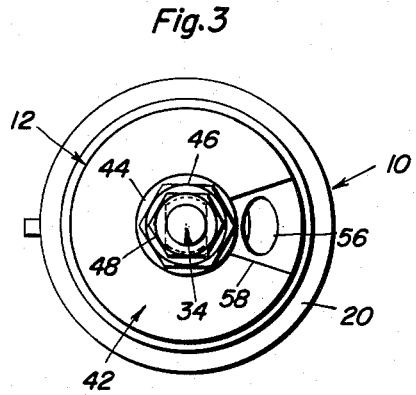
Fig.3
R Ellsworth Doremus
Richard E. Doremus
INVENTORS
BY *Clarence A. O'Brien*
and *Harvey B. Jackson*
Attorneys

United States Patent Office 2,992,654
Patented July 18, 1961

2,992,654
VALVE MEMBER AND SEAT MATERIAL
R Ellsworth Doremus, Clifton, and Richard E. Doremus, Upper Montclair, N.J., assignors to Krouse-Doremus Foundry Co., Clifton, N.J.
Filed June 6, 1958, Ser. No. 740,360
8 Claims. (Cl. 137—323)

This invention relates in general to new and useful improvements in valve construction, and more specifically to an improved valve member and the seat material used in conjunction therewith.

This is a continuation-in-part of our copending application Serial No. 633,682, filed January 11, 1957.

In certain industries, particularly the beer industry, there are used through valves each of which includes a valve member or body having a transverse wall with a flat seating surface and a flow passage therethrough. Opposing this wall is a valve member which has an opening therethrough alignable with the flow passage to permit the flow of liquids through the valve body. Disposed intermediate the valve member and the wall of the valve body is a seat material or sealing disk. Such a sealing disk in the past has been formed of rubber or rubber-like products. While such a sealing disk will operate properly for a period of time, due to the fact that the sealing disk is clamped between the wall of the valve body and the valve member, and since the material normally used in forming the sealing disk has a tendency to harden and stick to adjoining surfaces, there has been in the past a tendency for the sealing disk in use to stick to the wall seating surface and to the valve member so that when the butterfly valve member is turned, in lieu of there being a relative turning movement between the components which form the valve structure, a portion of the sealing disk sticks to the flat seating surface of the wall and another portion thereof sticks to the valve with the result that the sealing disk is ruptured and the valve rendered inoperate to seal off the container of which it is a part.

In recent years there has been developed a plastic which is referred to by the trade name Teflon. This particular plastic material has very desirable properties and has been used in the past for forming medical equipment as well as being used to form replacement parts for the human body. One of the primary advantages of Teflon is the fact that its physical properties remain constant under practically all conditions of use and it has neither a tendency to harden nor to stick to adjacent materials. Another highly desirable property of Teflon is that foreign matter does not adhere thereto and therefore it remains self-cleaning and sanitary.

Although the numerous advantages of the desirable propertits of Teflon has led to its use in many industries, to the best of our knowledge Teflon has not been used as a seat material or sealing material in conjunction with valves. One of the primary difficulties of the use of Teflon in a valve where there are relative rotating parts, is that it is difficult to adhere the Teflon to a rotating part in such a manner that the Teflon will rotate with such a part while it has a sufficient frictional engagement with an opposed surface of the nature to provide a seal under normal circumstances.

In view of the foregoing, it is the primary object of this invention to provide a valve member and seat material or sealing disk wherein the sealing disk is formed of Teflon and the valve member is formed of conventional non-corrosive metals with the Teflon sealing disk being so secured to the valve member whereby although the Teflon sealing disk is clamped between the valve member and a seating surface of a valve body, the Teflon sealing disk will turn in unison with the valve member.

Another object of this invention is to provide an improved replacement valve member and sealing disk for use in conjunction with existing valves, the valve member and sealing disk replacing existing valve members and the sealing disk which are now formed of rubber or rubber-like products whereby the replacement valve member and sealing disk may be used with the valve bodies now in use and will provide a valve which is no longer subject to deterioration while in use.

A further object of this invention is to provide an improved valve member and sealing disk wherein the sealing disk is formed of Teflon and there is provided between the sealing disk and the valve member an interlock of such a nature whereby relative movement between the sealing disk and the valve member is prevented so that under all operating conditions of a valve utilizing the valve member and the sealing disk, the valve body and sealing disk can be turned in unison.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top perspective view of a conventional type of valve which has been modified to utilize the valve member and sealing disk which is the subject of this invention;

FIGURE 2 is an enlarged vertical sectional view taken through the valve of FIGURE 1 and shows the specific details of the construction of the valve including the specific details of construction of the valve member and the Teflon sealing disk;

FIGURE 3 is an enlarged bottom plan view of the valve of FIGURE 1 and shows further the outline of the valve member;

FIGURE 4 is an enlarged sectional view taken substantially upon the plane indicated by the section line 4—4 of FIGURE 2 and shows the specific details of the seating surface of the valve member as well as the position of an opening therein alignable with a flow passage through the valve body to permit flow through the valve; and FIGURE 5 is a bottom view of the Teflon sealing disk and shows the surface configuration thereof for interlocking engagement with the valve member.

Referring now to the drawings in detail, it will be seen that there is illustrated in FIGURES 1, 2 and 3 a valve which is referred to in general by the reference numeral 10. The valve, except for the improvements which are the subject of this invention, is a conventional type of valve which is now used in the beer industry for sealing beer barrels and permitting the controlled flow of beer from such barrels. The valve 10 includes a valve body which is referred to in general by the reference numeral 12.

The valve body 12 includes a cylindrical body portion 14 which has the lower end thereof substantially closed by a wall 16. A partition wall 18 is disposed intermediate the ends of the cylindrical body 14. Projecting outwardly from the upper end of the cylindrical body 14 is a mounting flange 20. The partition wall 18 has a bore 22 therethrough which provides access to the lower part of the valve 10 and at the same time permits the flow of beer therethrough. The upper part of the partition wall surrounding the opening 22 is in the form of a seat 24 which is engaged by a fitting (not shown) locked in the upper part of the valve 10 when it is desired to remove beer from a container of which the valve 10 is a part. The inner surface of the cylindrical body 14 is provided with spiral grooves 26 and 28 for the reception of fingers of the fitting so as to lock the fitting to the valve body 12. The wall 16 has a central bore 30 therethrough in which there is journaled a circular cross-sectional portion 32 of a shaft which is referred to in general by the reference numeral 34. Disposed immediately above the circular cross-section portion 32 is an enlarged flange 36 which bears against the upper surface of the wall 16 and prevents further downward movement of the shaft 34. The upper end of the shaft 34 is in the form of a polygonal cross-sectional part 38 which is engaged by the fitting (not shown) which is positioned in the upper part of the valve body 12 and which is turned by the fitting as the fitting is turned into locking engagement with the valve body 12.

The lower portion of the shaft 34 is of a non-circular cross-section as at 40. Engaged on the lower portion 40 of the shaft 34 for rotation therewith is a valve member 42 which is a component of this invention. The valve member 42 is retained in place by a washer 44, a nut 46 and a lock nut 48 which are disposed in the lower end of the shaft 34, the lower end being externally threaded as at 50 to receive the nuts 46 and 48. The washer 44 bears against the lower end of the valve member 42.

The wall 16 of the valve body 10 has an undersurface in the form of a flat seating surface 52. Bearing against the flat seating surface 52 is a seat member or sealing disk 54 which is a second component of this invention. The sealing disk 54 is disposed intermediate the wall 16 and the valve member 42 and is clamped therebetween by the shaft 34.

In order that there may be controlled flow through the valve 10, the wall 16 is provided with an offset flow passage 56. Selectively alignable with the flow passage 56 are flow openings 58 and 60 in the valve member 42 and the sealing disk 54, respectively. These are best shown in FIGURES 4 and 5.

At this time it is pointed out that although one flow passage 56 and openings 58 and 60 have been illustrated, the number of such openings may vary as is desired by the industry. The openings have only been shown as examples and their position and relationship to the remainder of the valve structure in no way play an important part of this invention.

In order to further form a seal between the body 12 and the valve member 42, the upper surface of the valve member 42 is provided with an annular recess 62 around the shaft 34. Seated in the recess 62 is a sealing ring 64 which prevents the flow of liquid between the shaft 34 and the valve member 42. The sealing ring 64 is best illustrated in FIGURE 4.

The components of the valve 10, as now described, would not function. The sealing disk 54, being formed of Teflon, which material is relatively slippery and extremely smooth, would not turn simultaneously with the turning of the valve member 42. Inasmuch as it is absolutely necessary that the openings 58 and 60 remain aligned in order to both assure the opening of the valve 10 when desired and at the same time to assure the sealing of the flow passage 56 when flow through the valve 10 is not desired, it is necessary that the sealing disk 54 be secured to the valve member 42.

Recently there have been devised suitable adhesive which will bond Teflon to metal. However, the bond per se is not sufficient to permanently secure the Teflon sealing disk 54 to the valve member 42 to assure the two being turnable as a unit for the life of the valve 10. Therefore, in order that the properties of Teflon may be used to advantage in a valve of the type disclosed here and similar valves, it has been found that the simplest and permanent manner of securing the Teflon sealing disk 54 to the valve member 42 is by a mechanical interlock. For that reason there has been formed about the periphery of the upper surface of the valve member 42 a peripheral recess 66. Also, disposed in circumferentially spaced relation about the center of the valve member 42 and projecting upwardly from the upper surface thereof in radiating relation is a plurality of projections 68. Although that surface of the sealing disk 54 which engages the flat seating surface 52 of the wall 16 remains planar, the undersurface or that surface of the sealing disk 54 which engages the upper surface of the valve member 42 has been prior molded to form a downwardly projecting peripheral rib 70 which corresponds to the recess 66. Also, pre-molded in the undersurface of the Teflon sealing disk 54 are recesses 72 which correspond in size, shape and position to the projections 68. The undersurface of the Teflon sealing disk 54 has been preformed utilizing the method disclosed in our copending application Serial No. 633,682.

One of the critical properties of Teflon is the property of retaining its shape and the rigidity of such material. Thus once the Teflon sealing disk 54 has been molded to have the rib 70 in the depression or recesses 72, the Teflon sealing disk 54 will remain of this configuration and will not be effected by temperature changes or ordinary operating pressures. Therefore, once the Teflon sealing disk 54 is engaged with the upper surface of the valve member 42 and interlocked therewith, the two will remain in the interlocked condition inasmuch as the two cannot move longitudinally with respect to each other due to the function of the shaft 34 and the wall 16. Furthermore, the Teflon sealing disk 54 being clamped between the wall 16 and the valve member 42, the Teflon sealing disk 54 is being continuously molded to the configuration of the upper surface of the valve member 42. Therefore, the Teflon sealing disk 54 being formed of an indestructible material and a material which will not stick to the wall 16 under operating conditions, the sealing disk 54 will operate in the desired manner throughout the life of the valve 10.

From the foregoing, it will be readily apparent that there has been devised a new valve which, while it retains all of its old mechanical characteristics, due to the use of a new material for forming the sealing disk thereof, and by the provision of a novel interlock between the sealing material and the valve member to assure the simultaneous turning of the two, the old type valve has been converted into one which will operate under all conditions and which will in no way be subject to deterioration.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A valve construction comprising a valve body including a wall having a seating surface, a flow passage through said wall, a shaft extending through said wall, a valve member mounted on said shaft for rotation therewith, said valve member having a flow opening therein and a surface in oposed relation to said seating surface, said valve member surface also being formed with a depressed area thereon, the outer periphery of the depressed area being of substantially the same shape as the outer periphery of said valve member surface, a sealing member of flexible plastic material disposed intermediate said wall surface and said valve member surface, said sealing member having a central opening through which said shaft extends and a flow opening, one face of said sealing member being substantially smooth and disposed in opposed slidable sealing relation with said seating surface, the other face of said sealing member having a mating raised area of substantially the same general shape as the depressed area on said valve member to mechanically interlock with said depressed area with the flow openings thereof being substantially in alignment, said sealing member thereby being rotatable with said valve member and a seal being formed between said valve member surface and the sealing member by said mating depressed and raised areas.

2. A valve construction as set forth in claim 1, wherein said sealing member is formed of Teflon.

3. A valve construction comprising a valve body including a wall having a seating surface, a flow passage through said wall, a shaft extending through said wall, a valve member mounted on said shaft for rotation therewith, said valve member having a flow opening therein and a surface in opposed relation to said seating surface, said valve member surface also being formed with a depressed area thereon, the outer periphery of the depressed area being of substantially the same shape as the outer periphery of said valve member surface, said valve member surface also being formed with a plurality of projections, a sealing member of flexible plastic material disposed intermediate said wall surface and said valve member surface, said sealing member having a central opening through which said shaft extends and a flow opening, one face of said sealing member being substantially smooth and disposed in opposed slidable sealing relation with said seating surface, the other face of said sealing member having a mating raised area of substantially the same general shape as the depressed area on said valve member and a plurality of depressions to mate with the projections on said valve member to interlock said valve and sealing members with the flow openings thereof being substantially in alignment, said sealing member thereby being interlocked to said valve member and rotatable therewith and a seal being formed between said valve member surface and the sealing member by said depressed and raised areas.

4. A valve construction as set forth in claim 3, wherein said sealing member is formed of Teflon.

5. A valve construction comprising a valve body including a wall having a substantially flat sealing surface, a flow passage through said wall, a shaft extending through said wall, a valve member mounted on said shaft for rotation therewith, said valve member having a flow opening formed at its edge over a portion thereof and a surface in opposed relation to said seating surface, said valve member surface also being formed with a depressed area thereon, the outer periphery of said depressed area being of substantially the same shape as the outer periphery of said valve member surface including the sides of the valve member flow opening, a sealing member of flexible plastic material disposed intermediate said wall surface and said valve member surface, said sealing member having a central opening through which said shaft extends and a flow opening of substantially the same size and shape as the flow opening in said valve member, one face of said sealing member being substantially smooth and disposed in opposed slidable sealing relation with said seating surface, the other face of said sealing member having a mating raised area of substantially the same general shape as the depressed area on said valve member surface to interlock with said depressed area of said valve member with the flow openings thereof being substantially in alignment, said sealing member thereby being rotatable with said valve member and a seal being formed between said valve member surface and the sealing member by said mating depressed and raised areas.

6. A valve construction comprising a valve body including a wall having a substantially flat seating surface, a flow passage through said wall, a shaft extending through said wall, a valve member mounted on said shaft for rotation therewith, said valve member having a flow opening formed at its outer edge over a portion thereof and a surface in opposed relation to said seating surface, said valve member surface also being formed with a depressed area and a plurality of projections, the outer periphery of the depressed area being of substantially the same shape as the outer periphery of said valve member surface including the sides of the valve member flow opening, a sealing member of flexible plastic material disposed intermediate said wall surface and said valve member surface, said sealing member having a central opening through which said shaft extends and a flow opening of substantially the same size and shape as the flow opening in said valve member, one face of said sealing member being substantially smooth and disposed in opposed slidable sealing relation with said seating surface, the other face of said sealing member having a mating raised area of substantially the same general shape as the depressed area on said valve member and a plurality of mating depressions to interlock with the corresponding depressed area and projections of said valve member surface with the flow openings thereof being substantially in alignment, said sealing member thereby being interlocked to said valve member and rotatable therewith and a seal being formed between said valve member surface and the sealing member by said depressed and raised areas.

7. A valve construction as set forth in claim 6 wherein said sealing member is formed of Teflon.

8. A valve construction as set forth in claim 6 wherein the valve member has an additional depression of substantially annular shape around said shaft, and an O ring in said additional depression.

References Cited in the file of this patent

UNITED STATES PATENTS

| | | |
|---|---|---|
| 253,155 | Butler | Jan. 31, 1882 |
| 449,513 | Anthony | Mar. 31, 1891 |
| 549,653 | Paulus | Nov. 12, 1895 |
| 1,085,688 | Kaufman | Feb. 3, 1914 |
| 1,133,853 | Gold | Mar. 30, 1915 |
| 2,061,714 | Pick | Nov. 24, 1936 |
| 2,331,001 | Simon | Oct. 5, 1943 |
| 2,757,541 | Watson | Aug. 7, 1956 |
| 2,768,643 | Acomb | Oct. 30, 1956 |
| 2,776,104 | Sinkler | Jan. 1, 1957 |
| 2,793,654 | Bierman | May 28, 1957 |
| 2,815,187 | Hamer | Dec. 3, 1957 |
| 2,827,924 | Towler | Mar. 25, 1958 |
| 2,901,213 | Osroa | Aug. 25, 1959 |